(No Model.)  3 Sheets—Sheet 1.

D. S. STEWART.
SAWING MACHINE.

No. 606,035.  Patented June 21, 1898.

Witnesses:
Geo. W. Young
B. C. Roloff

Inventor
D. S. Stewart
By H. G. Underwood
Attorneys (No Model.) 3 Sheets—Sheet 3.

D. S. STEWART.
SAWING MACHINE.

No. 606,035. Patented June 21, 1898.

Witnesses:
Geo. W. Young,
B. C. Roloff

Inventor
D. S. Stewart
By H. G. Underwood
Attorneys

UNITED STATES PATENT OFFICE.

DAVID S. STEWART, OF CLINTONVILLE, WISCONSIN, ASSIGNOR OF ONE-HALF TO THE G. W. JONES LUMBER COMPANY, OF SAME PLACE.

SAWING-MACHINE.

SPECIFICATION forming part of Letters Patent No. 606,035, dated June 21, 1898.

Application filed August 4, 1897. Serial No. 647,064. (No model.)

*To all whom it may concern:*

Be it known that I, DAVID S. STEWART, a citizen of the United States, and a resident of Clintonville, in the county of Waupaca and State of Wisconsin, have invented certain new and useful Improvements in Sawing-Machines; and I do hereby declare that the following is a full, clear, and exact description thereof.

My invention relates to machines for sawing square-edged lumber from logs; and it consists in certain peculiarities of construction and combination of parts, as will be fully set forth hereinafter and subsequently claimed.

Figure 4:
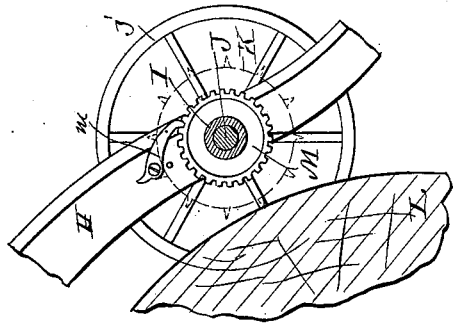
Figure 1:
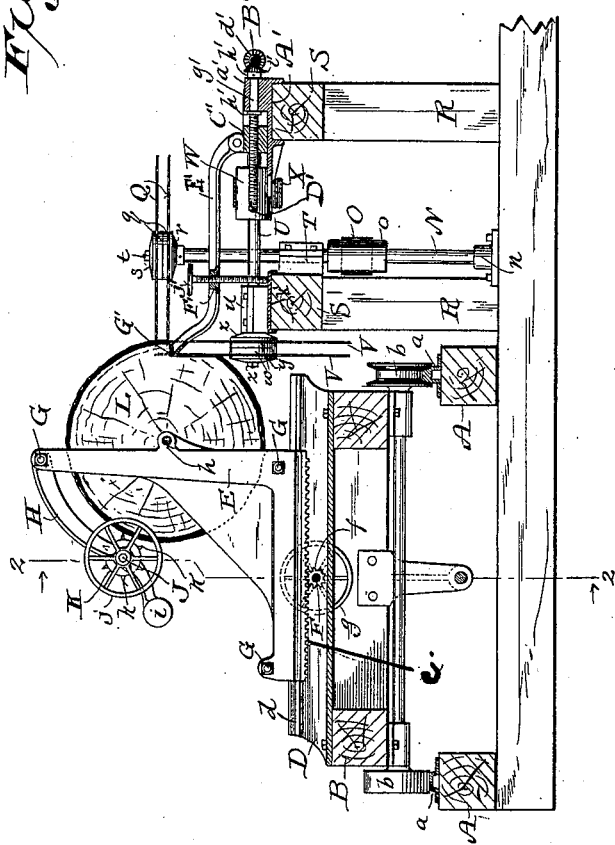
Figure 2:
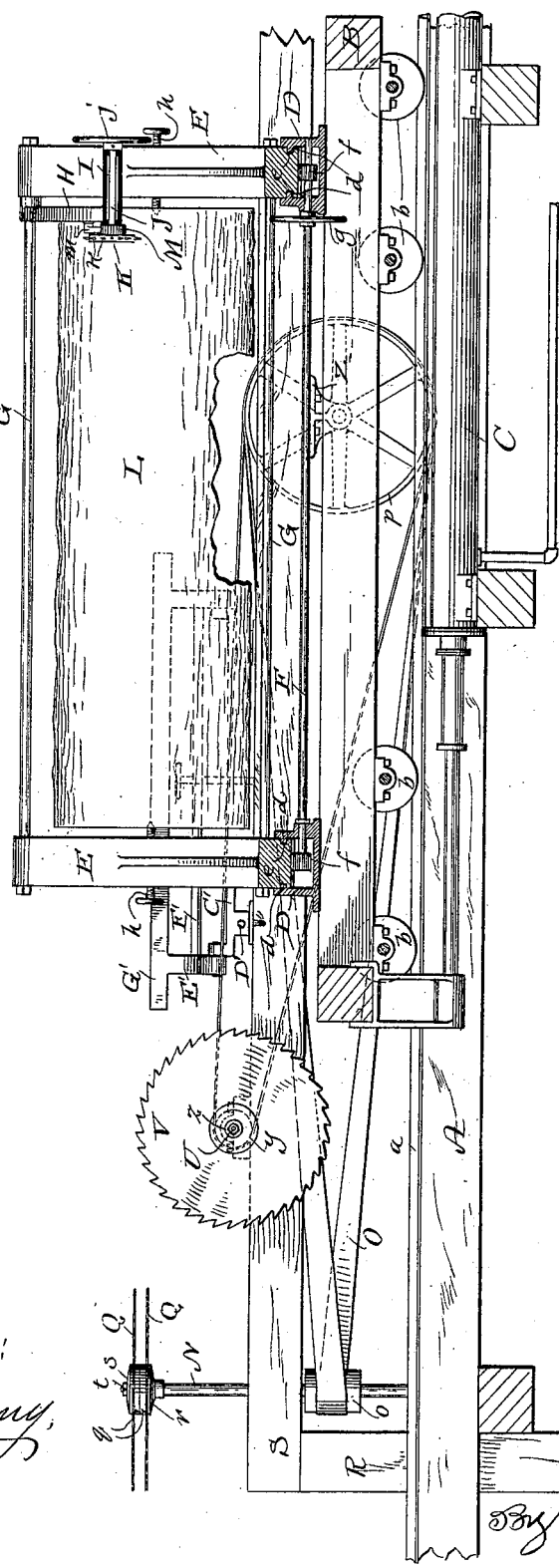
Figure 3:
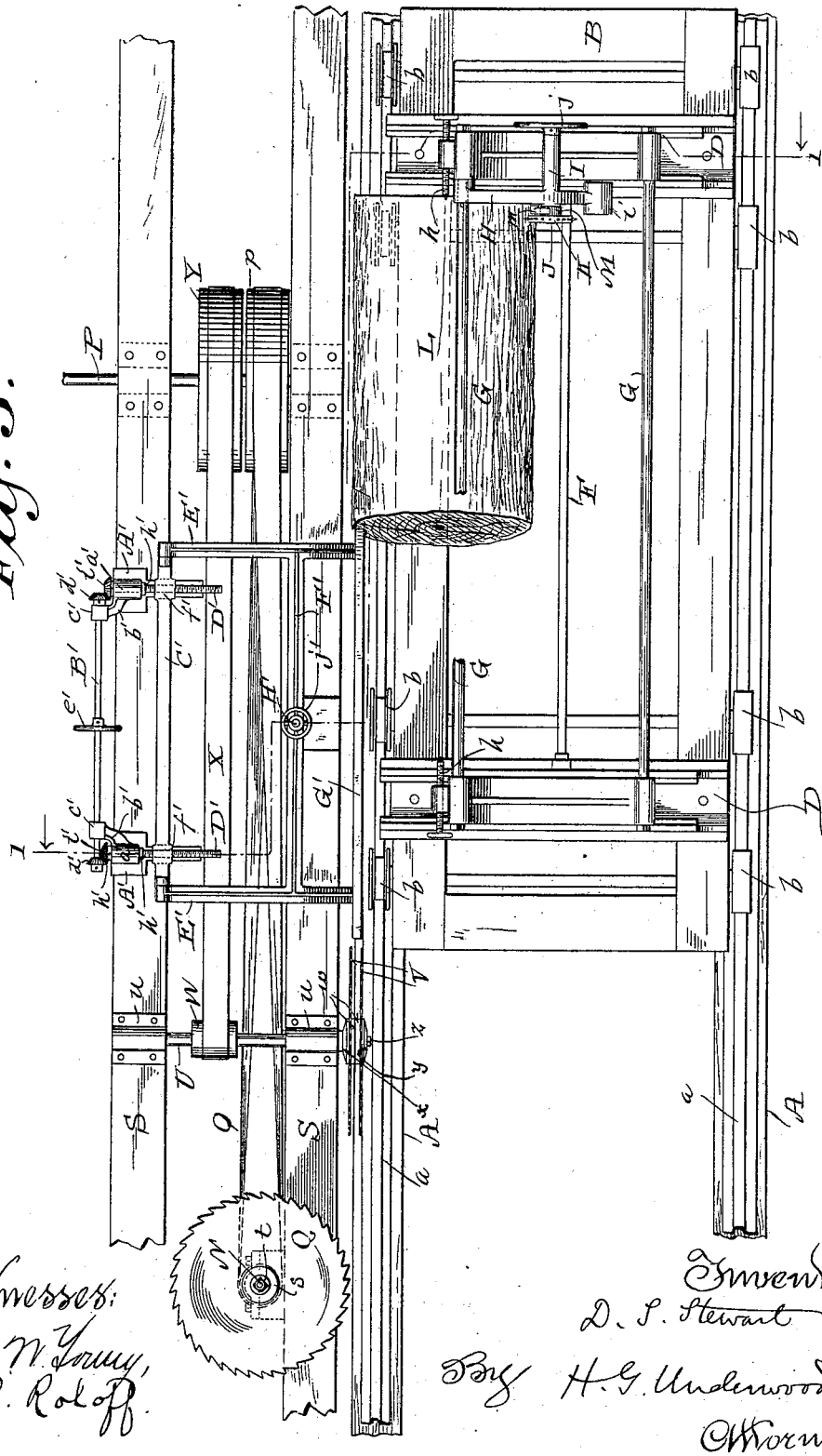

In the drawings, Figure 1 is a transverse section through a machine embodying my present invention on the line indicated by 1 1 in Fig. 3. Fig. 2 is a longitudinal vertical section on the line indicated by 2 2 in Fig. 1. Fig. 3 is a plan view of the entire device. Fig. 4 is a detail of the log-turning mechanism.

Referring to the drawings, A A represent the bed-pieces of a reciprocating timber-carriage, and *a a* the tracks thereon.

B represents the truck-frame of said timber-carriage, and *b b* are the wheels thereof, moving on said tracks *a a*. This carriage is caused to reciprocate to a proper distance by any suitable feed-works—such, for example, as the steam or compressed-air cylinder C and attachments shown in Fig. 2—and carries the log to be cut.

D D are transverse slideways on the truck-frame B to receive the end pieces E E of the carriage and permit the same to be moved toward or from the saw-frame. The said slideways are preferably formed each with two vertical flanges having longitudinal ribs *d d* on their inner faces to engage with corresponding grooves *e e* in the base portions of the said end pieces E E, said base portions being formed with toothed racks *c c* on their under sides, which engage with pinions *f f* on the ends of a rod F, turned by a hand-wheel *g* thereon when it is desired to move the said carriage in or out. The end pieces E E of the carriage are L-shaped and connected together by rods G G G. The log L is placed between the end pieces and secured by centers *h h*, which are pointed screws passing through suitable bores in the upright members of the end pieces and forced into the center of the log at each end, so that the said log may be revolved thereon. Mounted on the upper rod G close to one of the end pieces of the carriage is a curved arm H, and this arm is preferably loosely mounted on said rod and weighted, as shown at *i*, at its lower end, so as to adjust itself to logs of different diameters, and said arm is provided with a laterally-projecting sleeve I, through which passes a shaft J, bearing on its outer end a hand-wheel *j* and on its inner end a wheel K, having sharp points or fingers *k k* all around its periphery for engagement with the log to enable the latter to be turned thereby when the hand-wheel *j* is revolved. In order to keep the log steady in any position to which it has been thus turned, the said shaft J is further provided with a ratchet-wheel M just next the wheel K, and a dog or pawl *m* on the arm H engages with the teeth of said ratchet-wheel M, as best shown in Fig. 4.

I will next describe the arrangement of the saws. Rising from the platform or floor of the mill is a vertical arbor N, stepped in a bearing *n*, secured to said floor and carrying a pulley *o* for a belt O, whose other end passes around a pulley *p* on the power-shaft P, driven in the ordinary way by pulley and belt. (Not shown.) The upper end of this arbor N carries two horizontally-arranged saws Q Q, which can be secured any desired distance apart by means of suitable washers *q q*, interposed between them, the saws and adjusting-washers being firmly clamped between the lower disk *r*, which has a collar whereby it is secured to the arbor, and the upper disk *s*, which is crowded down by the nut *t*.

Uprights R R rise from the floor of the mill at suitable intervals to support horizontal timbers S S, and to the adjacent timber S there is secured a box or bearing T, through which the said vertical arbor N passes, all as best shown in Fig. 1. Some little distance back of the location of the said arbor N and the horizontal saws Q Q, carried thereby, the timbers S S are provided with journal-boxes *u u* for the reception of a horizontally-disposed arbor U, carrying at its inner end two vertically-arranged saws V V, separated by adjusting-washers *w w* and secured to the end of the arbor by inner disk $x$, outer disk $y$, and nut $z$, all as best shown in Fig. 3, this arrangement of adjusting the saws V V the desired distance apart and clamping them firmly upon the end of the arbor U being precisely the same as with the horizontal saws Q Q and their arbor N, already described. The arbor U carries a pulley W, from which a belt X extends to a pulley Y on the power-shaft P, said power-shaft being supported in boxes Z, secured to the timbers S.

To the outermost timber S, I secure plates A' A', provided with blocks $a'$, having smooth bores therethrough in a line transverse to the length of the said timber, and arms $b'$, projecting beyond said timber and terminating in other blocks $c'$, having smooth bores extending in a line at right angles to the line of the bores in blocks $a'$.

B' is a shaft extending through the bores in the blocks $c'$ and carrying bevel gear-pinions $d'$ $d'$ at its ends and a hand-wheel $e'$ at some convenient point.

C' is a cross-bar parallel with the shaft B' and having screw-threaded bores therethrough at the points $f'$ $f'$ in line with the smooth bores in the blocks $a'$ $a'$.

D' D' are screw-threaded rods passing through the screw-threaded bores in the cross-bar C', and the outer ends of said rods D' being smooth, as shown at $g'$, and passing through the smooth bores in the blocks $a'$, having collars $h'$ $h'$ on each end of said blocks and terminating in bevel gear-pinions $i'$ in mesh with the described pinions $d'$ on the shaft B'.

E' E' are two curved arms hinged or pivoted at their outer ends to the ends of the cross-bar C' and connected by a cross-bar F' intermediate of the ends of the said arms E' E' and a straight-edged bar G' at their extreme inner ends. The cross-bar F' is provided with a vertical screw-threaded bore therethrough for the reception of an adjusting-screw H', having a hand-wheel $j'$ on top, the lower end of said screw resting on a plate $k'$ on the innermost timber S. The entire last-described device from A' to H' constitutes a gage, as hereinafter explained.

The operation of my machine is as follows: The saws Q Q and V V are adjusted, respectively, the required distance apart according to the width and height desired in the lumber to be cut from the log, and the latter is brought inward toward the line of the saws the proper distance by turning the rod F and thereby, through the pinions $f$ $f$ on said rod and the racks $c$ $c$ on the under sides of the end pieces E E of the carriage, moving the latter inward. Power is exerted by the feed-works, (which feed-works may be of any description preferred, utilizing any desired power,) and the truck B of the carriage is moved forward the proper distance, and the log is thus carried against the saws, which are meanwhile revolved by the requisite power applied to their arbors, as described. The gage has been set to correspond in height and projection to the distances between each pair of saws, and when the carriage returns after its forward movement the freshly-cut portion of the log is received on the straight-edged bar G' of the gage. The adjustment of the gage after being set is never changed until a different-sized piece is to be sawed from the log, and then the gage is changed to correspond to any changes made in the distances between each pair of the saws, the height of the gage being regulated by the adjusting-screw H' and the inward projection of the gage being regulated by means of the hand-wheel $e'$ on the shaft B'. The log has to be turned after each cut, and when the carriage has been brought back the hand-wheel $j$ is turned after freeing the pawl $m$ from its engagement with the teeth of the ratchet-wheel M, and the points or fingers $k$ on the wheel K will turn the log until the square edges of the last cut come against the square-edged bar G' of the gage. Then the pawl $m$ is permitted to drop back to engagement with the ratchet-wheel M, thus locking the log in the proper position for the next cut, and the feed-works move the carriage and log forward again, and so on.

By my described invention I am enabled to saw particular sizes of lumber having right-angled sides, so that the said lumber shall be all either square or oblong, as desired, at one cut and so that all the lumber cut from the log shall have said parallel sides without any oblique or beveled edges or sides and all be of the same shape and size, if desired, until the entire log is cut up.

Having thus described my invention, what I claim as new, and desire to secure by Letters Patent, is—

1. In a lumber-sawing machine, the combination of a revoluble vertical arbor carrying a pair of horizontally-arranged saws, a revoluble horizontal arbor carrying a pair of vertically-arranged saws, means for varying the distance between the saws of each pair, a log-carriage adapted to reciprocate past said saws, means for moving said carriage laterally toward or from said saws, a frame pivotally secured to the saw-supporting frame and having upwardly-extending side pieces with a front straight-edged bar forming a gage, and means for adjusting the vertical and lateral projection of said gage to correspond to the distance between the saws of each pair, substantially as set forth.

2. In a lumber-sawing machine, the combination with the vertical end pieces of the log-carriage of centering-screws passing through said ends to revolubly support the log, an arm on said carriage carrying a revoluble shaft, a log-turning wheel, ratchet-wheel and hand-wheel on said shaft, and a dog or pawl on said arm for engagement with said ratchet-wheel to lock said shaft against rotation when desired, substantially as set forth.

3. In a lumber-sawing machine, the combination with a suitable frame of a revoluble vertical arbor carrying a pair of horizontally-arranged saws, a revoluble horizontal arbor carrying a pair of vertically-arranged saws, means for varying the distance between the saws of each pair, a frame pivotally secured to the saw-supporting frame and having upwardly-curved side pieces with a front straight-edged bar forming a gage, and means for adjusting the vertical and lateral projection of said gage to correspond to the distance between the saws of each pair, substantially as set forth.

In testimony that I claim the foregoing I have hereunto set my hand, at Clintonville, in the county of Waupaca and State of Wisconsin, in the presence of two witnesses.

DAVID S. STEWART.

Witnesses:
A. C. HUMPHREY,
L. E. KNUDSON.